United States Patent
Turgeman

(10) Patent No.: US 10,579,784 B2
(45) Date of Patent: Mar. 3, 2020

(54) SYSTEM, DEVICE, AND METHOD OF SECURE UTILIZATION OF FINGERPRINTS FOR USER AUTHENTICATION

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 80 days.

(21) Appl. No.: 15/675,740

(22) Filed: Aug. 13, 2017

(65) Prior Publication Data

US 2018/0121640 A1  May 3, 2018

Related U.S. Application Data

(60) Provisional application No. 62/416,177, filed on Nov. 2, 2016.

(51) Int. Cl.
*G06F 21/32* (2013.01)
*G06K 9/00* (2006.01)
*G06F 3/01* (2006.01)

(52) U.S. Cl.
CPC .............. *G06F 21/32* (2013.01); *G06F 3/017* (2013.01); *G06K 9/00013* (2013.01); *G06K 9/00335* (2013.01)

(58) Field of Classification Search
CPC ...... G06F 21/32; G06F 3/017; G06K 9/00013
See application file for complete search history.

(56) References Cited

U.S. PATENT DOCUMENTS 3,618,019 A  11/1971 Nemirovsky
3,699,517 A  10/1972 Dyche
(Continued)

FOREIGN PATENT DOCUMENTS

EP  2410450  1/2012
EP  2410450 A1  1/2012
(Continued)

OTHER PUBLICATIONS

Stinson et al., "Characterizing Bots' Remote Control Behavior". Detection of Intrusions and Malware, and Vulnerability Assessment. Springer Berlin Heidelberg, p. 89-108. Dec. 31, 2007.
(Continued)

*Primary Examiner* — Ruiping Li
(74) *Attorney, Agent, or Firm* — Eitan Mehulal Sadot

(57) ABSTRACT

System, device, and method of secure utilization of fingerprints for user authentication. A method includes: capturing a fingerprint that a particular user provides to an electronic device; generating a raw fingerprint signature that corresponds to bodily features of the fingerprint of the particular user; monitoring user interactions of the particular user, during the capturing of the raw fingerprint, via one or more input units of the electronic device; extracting from the monitored user interactions a user-specific characteristic that is user-specific to the interactions of the particular user; generating a user-specific reference fused data-item, by utilizing both: (I) the raw fingerprint signature that was generated, and (II) the user-specific characteristic that was extracted; subsequently, utilizing the reference fused data-item as a reference for user-authentication.

20 Claims, 1 Drawing Sheet

(56) References Cited

U.S. PATENT DOCUMENTS

| | | | |
|---|---|---|---|
| 3,983,535 | A | 9/1976 | Herbst |
| 4,128,829 | A | 12/1978 | Herbst |
| 4,621,334 | A | 11/1986 | Garcia |
| 4,760,386 | A | 7/1988 | Heath |
| 4,805,222 | A | 2/1989 | Young |
| 5,305,238 | A | 4/1994 | Starr |
| 5,442,342 | A | 8/1995 | Kung |
| 5,485,171 | A | 1/1996 | Copper |
| 5,557,686 | A | 9/1996 | Brown |
| 5,565,657 | A | 10/1996 | Merz |
| 5,581,261 | A | 12/1996 | Hickman |
| 5,838,306 | A | 11/1998 | O'Connor |
| 5,874,941 | A | 2/1999 | Yamada |
| 5,999,162 | A | 12/1999 | Takahashi |
| 6,202,023 | B1 | 3/2001 | Hancock |
| 6,337,686 | B2 | 1/2002 | Wong |
| 6,337,919 | B1 | 1/2002 | Dunton |
| 6,442,692 | B1 | 8/2002 | Zilberman |
| 6,572,014 | B1 | 6/2003 | Lambert |
| 6,819,219 | B1 | 11/2004 | Bolle |
| 6,836,554 | B1 | 12/2004 | Bolle |
| 6,895,514 | B1 | 5/2005 | Kermani |
| 6,931,131 | B1 | 8/2005 | Becker |
| 6,938,061 | B1 | 8/2005 | Rumynin |
| 6,938,159 | B1 | 8/2005 | O'Connor |
| 6,957,185 | B1 | 10/2005 | Labaton |
| 6,957,186 | B1 | 10/2005 | Guheen |
| 6,983,061 | B2 | 1/2006 | Ikegami |
| 7,092,926 | B2 | 8/2006 | Cerrato |
| 7,130,452 | B2 | 10/2006 | Bolle |
| 7,133,792 | B2 | 11/2006 | Murakami |
| 7,139,916 | B2 | 11/2006 | Billingsley |
| 7,158,118 | B2 | 1/2007 | Liberty |
| 7,236,156 | B2 | 6/2007 | Liberty |
| 7,245,218 | B2 | 7/2007 | Ikehara |
| 7,366,919 | B1 | 4/2008 | Sobel |
| 7,395,436 | B1 | 7/2008 | Nemovicher |
| 7,494,061 | B2 | 2/2009 | Reinhold |
| 7,523,191 | B1 | 4/2009 | Thomas |
| 7,535,456 | B2 | 5/2009 | Liberty |
| 7,606,915 | B1 | 10/2009 | Calinov |
| 7,796,013 | B2 | 9/2010 | Murakami |
| 7,818,290 | B2 | 10/2010 | Davis |
| 7,860,870 | B2 | 12/2010 | Sadagopan |
| 8,031,175 | B2 | 10/2011 | Rigazio |
| 8,065,624 | B2 | 11/2011 | Morin |
| 8,125,312 | B2 | 2/2012 | Orr |
| 8,156,324 | B1 | 4/2012 | Shnowske |
| 8,201,222 | B2 | 6/2012 | Inoue |
| 8,285,658 | B1 | 10/2012 | Kellas-Dicks |
| 8,417,960 | B2 | 4/2013 | Takahashi |
| 8,433,785 | B2 | 4/2013 | Awadallah |
| 8,449,393 | B2 | 5/2013 | Sobel |
| 8,499,245 | B1 | 7/2013 | Froment |
| 8,510,113 | B1 | 8/2013 | Conkie |
| 8,548,208 | B2 | 10/2013 | Schultz |
| 8,549,629 | B1 | 10/2013 | Mccreesh |
| 8,555,077 | B2 | 10/2013 | Davis |
| 8,745,729 | B2 | 6/2014 | Poluri |
| 8,788,838 | B1 | 8/2014 | Fadell |
| 8,803,797 | B2 | 8/2014 | Scott |
| 8,819,812 | B1 | 8/2014 | Weber |
| 8,832,823 | B2 | 9/2014 | Boss |
| 8,838,060 | B2 | 9/2014 | Walley |
| 8,880,441 | B1 | 11/2014 | Chen |
| 8,898,787 | B2 | 11/2014 | Thompson |
| 8,938,787 | B2 | 1/2015 | Turgeman |
| 8,941,466 | B2 | 1/2015 | Bayram |
| 8,990,959 | B2 | 3/2015 | Zhu |
| 9,069,942 | B2 | 6/2015 | Turgeman |
| 9,071,969 | B2 | 6/2015 | Turgeman |
| 9,154,534 | B1 | 10/2015 | Gayles |
| 9,174,123 | B2 | 11/2015 | Nasiri |
| 9,195,351 | B1 | 11/2015 | Rosenberg |
| 9,275,337 | B2 | 3/2016 | Turgeman |
| 9,282,112 | B2 | 3/2016 | Filatov |
| 9,301,140 | B1 | 3/2016 | Costigan |
| 9,304,915 | B2 | 4/2016 | Adams |
| 9,418,221 | B2 | 8/2016 | Turgeman |
| 9,450,971 | B2 | 9/2016 | Turgeman |
| 9,477,826 | B2 | 10/2016 | Turgeman |
| 9,483,292 | B2 | 11/2016 | Turgeman |
| 9,526,006 | B2 | 12/2016 | Turgeman |
| 9,529,987 | B2 | 12/2016 | Deutschmann |
| 9,531,701 | B2 | 12/2016 | Turgeman |
| 9,531,733 | B2 | 12/2016 | Turgeman |
| 9,536,071 | B2 | 1/2017 | Turgeman |
| 9,541,995 | B2 | 1/2017 | Turgeman |
| 9,547,766 | B2 | 1/2017 | Turgeman |
| 9,552,470 | B2 | 1/2017 | Turgeman |
| 9,558,339 | B2 | 1/2017 | Turgeman |
| 9,589,120 | B2 | 3/2017 | Samuel |
| 9,621,567 | B2 | 4/2017 | Turgeman |
| 9,626,677 | B2 | 4/2017 | Turgeman |
| 9,665,703 | B2 | 5/2017 | Turgeman |
| 9,674,218 | B2 | 6/2017 | Turgeman |
| 9,690,915 | B2 | 6/2017 | Turgeman |
| 9,703,953 | B2 | 7/2017 | Turgeman |
| 9,710,316 | B1 | 7/2017 | Chheda |
| 9,712,558 | B2 | 7/2017 | Turgeman |
| 9,747,436 | B2 | 8/2017 | Turgeman |
| 9,779,423 | B2 | 10/2017 | Turgeman |
| 9,838,373 | B2 | 12/2017 | Turgeman |
| 9,848,009 | B2 | 12/2017 | Turgeman |
| 9,927,883 | B1 | 3/2018 | Lin |
| 10,032,010 | B2 | 7/2018 | Turgeman |
| 10,037,421 | B2 | 7/2018 | Turgeman |
| 10,049,209 | B2 | 8/2018 | Turgeman |
| 10,055,560 | B2 | 8/2018 | Turgeman |
| 10,069,837 | B2 | 9/2018 | Turgeman |
| 10,069,852 | B2 | 9/2018 | Turgeman |
| 10,079,853 | B2 | 9/2018 | Turgeman |
| 10,083,439 | B2 | 9/2018 | Turgeman |
| 10,164,985 | B2 | 12/2018 | Turgeman |
| 10,198,122 | B2 | 2/2019 | Turgeman |
| 10,262,324 | B2 | 4/2019 | Turgeman |
| 10,298,614 | B2 | 5/2019 | Turgeman |
| 10,395,018 | B2 | 8/2019 | Turgeman |
| 10,397,262 | B2 | 8/2019 | Karabchevsky |
| 2001/0004733 | A1 | 6/2001 | Eldering |
| 2002/0023229 | A1 | 2/2002 | Hangai |
| 2002/0089412 | A1 | 7/2002 | Heger |
| 2003/0033526 | A1 | 2/2003 | French |
| 2003/0074201 | A1 | 4/2003 | Grashey |
| 2003/0137494 | A1 | 7/2003 | Tulbert |
| 2003/0212811 | A1 | 11/2003 | Thornton |
| 2004/0015714 | A1 | 1/2004 | Abraham |
| 2004/0017355 | A1 | 1/2004 | Shim |
| 2004/0021643 | A1 | 2/2004 | Hoshino |
| 2004/0034784 | A1 | 2/2004 | Fedronic |
| 2004/0062423 | A1 | 4/2004 | Doi |
| 2004/0111523 | A1 | 6/2004 | Hall |
| 2004/0123156 | A1 | 6/2004 | Hammond |
| 2004/0143737 | A1 | 7/2004 | Teicher |
| 2004/0186882 | A1 | 9/2004 | Ting |
| 2004/0221171 | A1 | 11/2004 | Ahmed |
| 2005/0008148 | A1 | 1/2005 | Jacobson |
| 2005/0060138 | A1 | 3/2005 | Wang |
| 2005/0179657 | A1 | 8/2005 | Russo |
| 2005/0289264 | A1 | 12/2005 | Illowsky |
| 2006/0006803 | A1 | 1/2006 | Huang |
| 2006/0080263 | A1 | 4/2006 | Willis |
| 2006/0090073 | A1 | 4/2006 | Steinberg |
| 2006/0123101 | A1 | 6/2006 | Buccella |
| 2006/0143454 | A1 | 6/2006 | Walmsley |
| 2006/0195328 | A1 | 8/2006 | Abraham |
| 2006/0215886 | A1 | 9/2006 | Black |
| 2006/0224898 | A1 | 10/2006 | Ahmed |
| 2006/0282660 | A1 | 12/2006 | Varghese |
| 2006/0284969 | A1 | 12/2006 | Kim |
| 2007/0118804 | A1 | 5/2007 | Raciborski |
| 2007/0156443 | A1 | 7/2007 | Gurvey |
| 2007/0174082 | A1 | 7/2007 | Singh |
| 2007/0183633 | A1 | 8/2007 | Hoffmann |

(56) References Cited

U.S. PATENT DOCUMENTS

| | | |
|---|---|---|
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2009/0037983 A1 | 2/2009 | Chiruvolu |
| 2009/0038010 A1 | 2/2009 | Ma |
| 2009/0089879 A1 | 4/2009 | Wang |
| 2009/0094311 A1 | 4/2009 | Awadallah |
| 2009/0132395 A1 | 5/2009 | Lam |
| 2009/0157792 A1 | 6/2009 | Fiatal |
| 2009/0172551 A1 | 7/2009 | Kane |
| 2009/0189736 A1 | 7/2009 | Hayashi |
| 2009/0199296 A1 | 8/2009 | Xie |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1* | 3/2011 | Zhang ............... G06F 3/045 340/5.82 |
| 2011/0063211 A1 | 3/2011 | Hoerl |
| 2011/0065504 A1 | 3/2011 | Dugan |
| 2011/0102570 A1 | 5/2011 | Wilf |
| 2011/0105859 A1 | 5/2011 | Popovic |
| 2011/0113388 A1 | 5/2011 | Eisen |
| 2011/0154273 A1 | 6/2011 | Aburada |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0124662 A1 | 5/2012 | Baca |
| 2012/0133055 A1 | 5/2012 | Machida |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0240223 A1* | 9/2012 | Tu ............... A63F 13/12 726/19 |
| 2012/0246737 A1 | 9/2012 | Paxton |
| 2012/0252410 A1 | 10/2012 | Williams |
| 2012/0278804 A1 | 11/2012 | Narayanasamy |
| 2012/0284380 A1 | 11/2012 | Anderson |
| 2013/0024239 A1 | 1/2013 | Baker |
| 2013/0036416 A1 | 2/2013 | Raju |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0111586 A1 | 5/2013 | Jackson |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0212674 A1 | 8/2013 | Boger |
| 2013/0239195 A1 | 9/2013 | Turgeman |
| 2013/0239206 A1 | 9/2013 | Draluk |
| 2013/0282637 A1 | 10/2013 | Costigan |
| 2013/0288647 A1 | 10/2013 | Turgeman |
| 2013/0305357 A1 | 11/2013 | Ayyagari |
| 2013/0312097 A1 | 11/2013 | Turnbull |
| 2013/0335349 A1 | 12/2013 | Ferren |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |

(56) References Cited

U.S. PATENT DOCUMENTS

| | | |
|---|---|---|
| 2014/0082369 A1 | 3/2014 | Waclawsky |
| 2014/0111451 A1 | 4/2014 | Park |
| 2014/0118520 A1 | 5/2014 | Slaby |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1 | 7/2014 | Mun |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2015/0002479 A1 | 1/2015 | Kawamura |
| 2015/0012920 A1 | 1/2015 | De Santis |
| 2015/0062078 A1 | 3/2015 | Christman |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213246 A1 | 7/2015 | Turgeman |
| 2015/0213251 A1 | 7/2015 | Turgeman |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0310196 A1 | 10/2015 | Turgeman |
| 2016/0006800 A1 | 1/2016 | Summers |
| 2016/0034673 A1 | 2/2016 | Chandra |
| 2016/0042164 A1 | 2/2016 | Goldsmith |
| 2016/0077620 A1 | 3/2016 | Choi |
| 2016/0109969 A1 | 4/2016 | Keating |
| 2016/0132105 A1 | 5/2016 | Turgeman |
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0294837 A1 | 10/2016 | Turgeman |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0140279 A1 | 5/2017 | Turgeman |
| 2017/0149958 A1 | 5/2017 | Xian |
| 2017/0154366 A1 | 6/2017 | Turgeman |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364673 A1* | 12/2017 | Gupta ............... G06N 99/005 |
| 2017/0364919 A1 | 12/2017 | Ranganath |
| 2018/0012227 A1 | 1/2018 | Tunnell |
| 2018/0034850 A1 | 2/2018 | Turgeman |
| 2018/0095596 A1 | 4/2018 | Turgeman |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0160309 A1 | 6/2018 | Turgeman |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0156034 A1 | 5/2019 | Kedem |
| 2019/0158535 A1 | 5/2019 | Kedem |
| 2019/0220863 A1 | 7/2019 | Novick |

FOREIGN PATENT DOCUMENTS

| | | |
|---|---|---|
| EP | 2477136 | 7/2012 |
| EP | 2477136 A1 | 7/2012 |
| EP | 2610776 | 7/2013 |
| EP | 2610776 A2 | 7/2013 |
| EP | 2646904 B1 | 8/2018 |
| EP | 3019991 B1 | 2/2019 |
| ES | 2338092 | 5/2010 |
| ES | 2338092 A1 | 5/2010 |
| WO | 2005099166 A2 | 10/2005 |
| WO | 2007146437 | 12/2007 |
| WO | 2007146437 A2 | 12/2007 |
| WO | 2012073233 | 6/2012 |
| WO | 2012073233 A1 | 6/2012 |

OTHER PUBLICATIONS

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ahmed et al., "A New Biometric Technology Based on Mouse Dynamics", Jul.-Sep. 2007, IEEE Transactions on Dependable and Secure Computing, vol. 4, No. 3, pp. 165-179.

Bailey, Kyle O., "Computer Based Behavioral Biometric Authentication via Multi-Modal Fusion", Thesis, 2013, Air Force Insitute of Technology.

Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

(56) References Cited

OTHER PUBLICATIONS

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Ben Hansen, "The Blur Busters Mouse Guide", dated Feb. 1, 2014; printed from the Internet on Aug. 5, 2019 from: https://www.blurbusters.com/faq/mouse-guide/.

Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.

International Search Report for PCT international application PCT/IL2018/051246, dated Mar. 11, 2019.

Written Opinion of the International Searching Authority for PCT international application PCT/IL2018/051246, dated Mar. 11, 2019.

Written Opinion of the International Searching Authority for PCT international application PCT/IL2011/000907, dated Apr. 19, 2012.

Written Opinion of the International Searching Authority for PCT international application PCT/IB2014/062293, dated Oct. 1, 2014.

Written Opinion of the International Searching Authority for PCT international application PCT/IB2014/062941, dated Dec. 17, 2014.

Written Opinion of the International Searching Authority for PCT international application PCT/IB2016/054064, dated Jul. 9, 2015.

Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.

Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for application 11844440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

Nance et al., "Virtual Machine Introspection", IEEE Security & Privacy, 2008.

Garfinkel and Rosenblum, "A virtual Machine Introspection-Based Architecture for Intrusion Detection.", 2003, Proc. Network and Distributed Systems Security Symp., The Internet Society, pp. 191-206.

Spafford et al., "Software Forensics: Can We Track Code to its Authors?", Feb. 1992, Computer Science Technical Report, Purdue e-Pubs, Report No. CSD-TR-92-010.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Zheng et al., "An Efficient User Verification System via Mouse Movements", Oct. 17-21, 2011, CCS' 11, Chicago, Illinois.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Georgia Frantzeskou et al., "Identifying Authorship by Byte-Level N-Grams: The source Code Author Profile (SCAP) Method", Spring 2007, International Journal of Digital Evidence, vol. 6, issue 1.

Franklin et al., "Remote Detection of Virtual Machine Monitors with Fuzzy benchmarking", ACM SIGOPS Operating Systems Review, V42, Issue 3, Apr. 2008.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

* cited by examiner

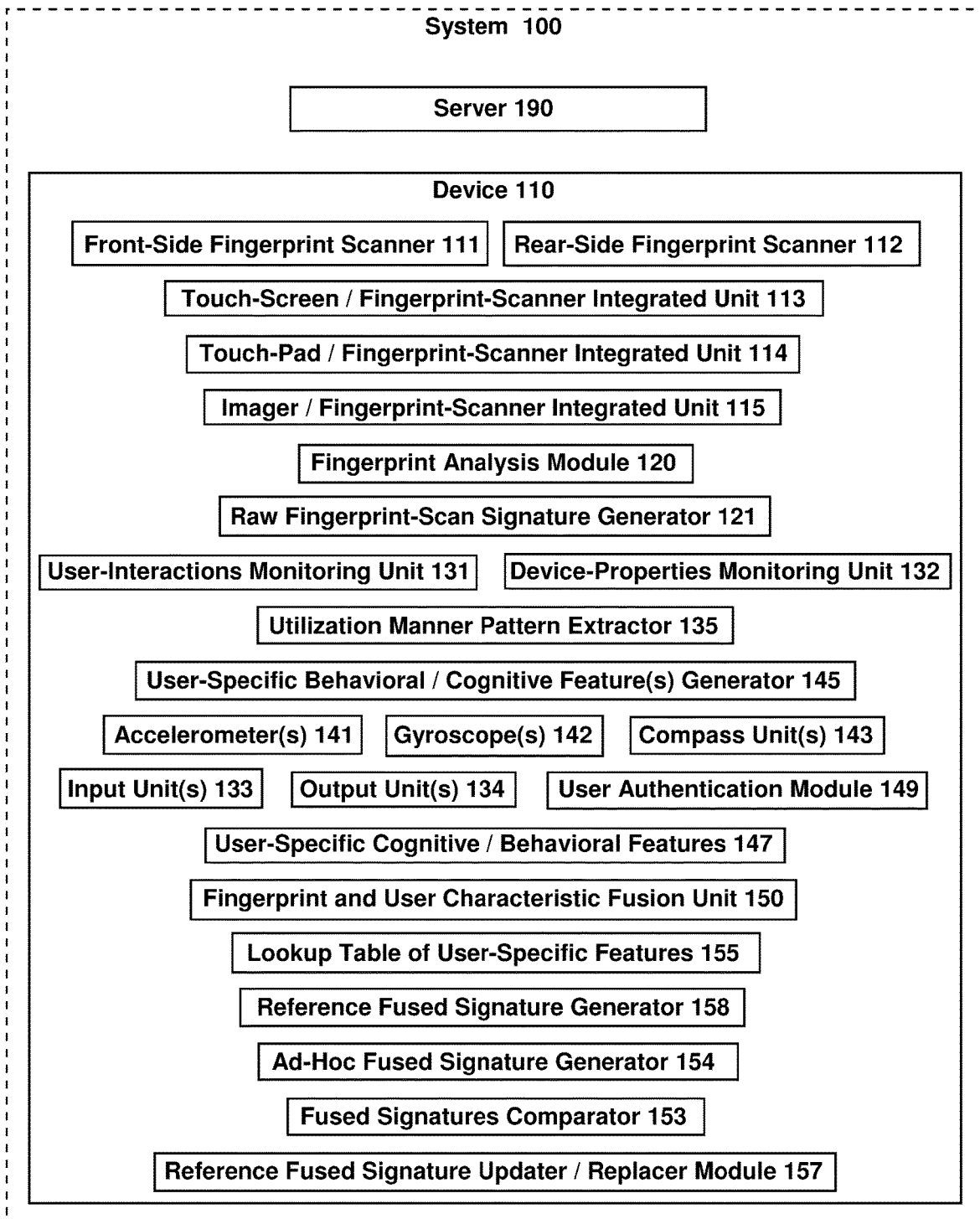

SYSTEM, DEVICE, AND METHOD OF SECURE UTILIZATION OF FINGERPRINTS FOR USER AUTHENTICATION

CROSS-REFERENCE TO RELATED APPLICATIONS

This application claims benefit and priority from U.S. provisional patent application No. 62/416,177, filed on Nov. 2, 2016, which is hereby incorporated by reference in its entirety.

FIELD

The present invention is related to the field of electronic devices.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

Some embodiments of the present invention may comprise, for example, devices, systems, and methods for utilizing fingerprint(s) of a user for purposes of user authentication, user identity verification, user identity confirmation, and/or as other purposes, in a secure manner that may enable to re-utilize the original fingerprint(s) of a user even if, or after, his fingerprint(s) are duplicated or forged or imitated or "lifted" by an attacker or a hacker.

The present invention may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF THE PRESENT INVENTION

Reference is made to FIG. 1, which is a schematic block-diagram of a system 100, in accordance with some demonstrative embodiments of the present invention. System 100 may comprise an electronic device 110, which may optionally communicate with a remote server 190 over a network or wireless communication link(s) or wired communication link(s).

Device 110 may be, for example, e.g., a smartphone, tablet, smart-watch, Augmented Reality (AR) device, Virtual Reality (VR) device, laptop computer, notebook computer, desktop computer, gaming device, audio/video player or streaming device, smart television, Automatic Teller Machine (ATM), a user-authentication device that enables a user to authenticate in order to enter into (or exit from, or pass through) a gate or a door or a turnstile or an office or other destination, a vehicular unit or vehicular dashboard component, or other suitable electronic device or unit.

In accordance with the present invention, device 110 may comprise or may utilize a unit or module for reading or scanning or capturing or measuring or otherwise sensing fingerprint(s) of a user. For example, device 110 may be a smartphone, and may comprise a dedicated front-side fingerprint scanner 111 or reader or sensor; and/or a dedicated rear-side fingerprint scanner 112 or reader or sensor. Additionally or alternatively, the device 110 may comprise a different type of unit, such as a touch-screen or a multi-touch screen or a touch-pad or a camera or an imager, which may have fingerprint-reading or fingerprint-scanning or fingerprint-capturing or fingerprint-measuring capabilities integrated therein; for example, a touch-screen/fingerprint-scanner integrated unit 113, or a touch-pad/fingerprint-scanner integrated unit 114, or an imager/fingerprint-scanner integrated unit 115.

The Applicants have realized that many devices and systems may rely on a fingerprint of a user, as a user authentication factor in order to authenticate a user towards the device itself (e.g., local authentication) and/or towards a remote server or a computerized service (e.g., remote authentication), or as a partial or entire replacement for a username and/or for a password and/or for a Personal Identification Number (PIN).

The Applicants have further realized that fingerprint(s) of a user of an electronic device can easily be forged, duplicated, or "lifted" by an attacker or hacker or impostor. For example, an attacker may utilize bonding tape to "lift" fingerprints from a touch-screen of a smartphone; or may use a high-definition camera to image and duplicate fingerprints that are visible on a surface (e.g., on a dusty table, or on a back panel of a laptop computer) or even are visible on an imaged finger; or to utilize other fingerprint "lifting" techniques, such as dental mold and/or three-dimensional printing, in order to duplicate a fingerprint and to create an impostor fingerprint or a replica fingerprint. Additionally or alternatively, digital data representing the scanned fingerprint of a user may be stolen from a database or from an electronic device, and may be used by an attacker to reconstruct a fingerprint posing as the legitimate user.

The Applicants have also realized that once a fingerprint of a particular user has been successfully (and typically illegitimately and/or without the user's permission and/or without the user's knowledge and/or without the user's awareness) forged, duplicated, replicated, imaged, or "stolen" or "lifted", the user may be susceptible for a lifetime of security exposure, since the user cannot replace or "reset" his own fingerprint(s). Accordingly, further utilization of a fingerprint of a user that was stolen or duplicated, may be worthless for the entire lifetime of the user; and such use may not be able to utilize, ever again, his fingerprint(s) for purposes of user authentication or other purposes; as the "real", genuine, legitimate user cannot "replace" his own fingerprint(s) with replacement one(s).

In accordance with the present invention, a fingerprint of a user is sensed or read or scanned or measured during a user interaction (e.g., with a dedicated fingerprint scanner; or with a hybrid fingerprint sensor that is integrated within another unit, such as touch-screen or touch-pad or imager); by a suitable fingerprint scanning unit, for example, one of fingerprint scanners 111-115.

The captured fingerprint is then analyzed by a fingerprint analysis module 120; and a static "raw" user-specific signature is generated, corresponding to (or based on) the physical or body features and properties identified in the fingerprint (e.g., curves, ridges, patterns). For example, a raw fingerprint-scan signature generator 121 may generate the user-specific signature that reflects the particular physical characteristics or bodily characteristics of the fingerprint of the user.

However, the digital representation of the captured fingerprint can be duplicated or stolen (e.g., by a hacker or cyber-attacker that hacks into a database that stores such "raw" fingerprint signature data; or by a local malware module which may secretly and illegitimately run on the electronic device that scanned the user's fingerprint). Therefore, the present invention avoids or prevents the utilization of such "raw" fingerprint signature on its own; in order to avoid a non-desired situation in which that unique, never-changing, "raw" fingerprint signature is stolen or duplicated or otherwise compromised, and thus cannot be reliably used ever again, for the lifetime of the user.

Instead, a user-interaction monitoring unit 131, and a device-properties monitoring unit 132, operate to monitor the interactions of the user with input unit(s) 133 and/or output unit(s) 134 of the device; such as, monitoring clicks and/or taps and/or on-screen-pointer movements and/or on-screen-touch-movements and/or on-screen-gestures that the user performs using an input unit (keyboard, mouse, touch-screen), monitoring the manner in which the user interacts with a computerized system or element (e.g., monitoring whether the user clicks "submit" or alternatively presses the "Enter" key; monitoring whether the user uses the "Tab" key or the mouse to move between fields in a form, or by performing other operations via a utilization manner pattern extractor 135), monitoring spatial properties of the electronic device during and/or immediately prior to and/or immediately after such interactions (e.g., measuring and sensing device acceleration, device orientation, device spatial position, device tilting or slanting, using accelerometer(s) 141 and/or gyroscope(s) 142 and/or compass unit(s) 143 of the device and/or other device-orientation sensor(s) or other units). It is noted that the word "during", as utilized herein, may include operations or using interactions or device properties that are sensed or performed concurrently or simultaneously or in an overlapping time-slot or in an at least partially-overlapping time-slot; and/or may include operations or using interactions or device properties that are sensed or performed immediately prior (e.g., in the most-recent K milliseconds prior; wherein K is, for example, 100 or 500 or 1,000 or 2,000 or 3,000 or other suitable value) and/or immediately after (e.g., in the K milliseconds that immediately follow).

The electronic device (e.g., locally) and/or a remote server (e.g., remotely), may analyze the monitored user interactions and/or the monitored device properties; and may generate one or more, or a set of, signatures or user-specific features; for example, via a user-specific behavioral/cognitive feature(s) generator 145 able to extract cognitive features and/or behavioral features. The set of such user-specific features may be stored, as discrete and separate data-items, in a user-specific cognitive/behavioral features 147, which may be stored locally within device 110 and/or remotely on remote server 190.

The "raw" fingerprint signature of the user, is static in it nature and cannot be changed by the user. In contrast, each one of the user-specific features that are extracted are generally stochastic or dynamic in their nature; namely, the user's future interactions will typically exhibit such characteristics, but they are not easily duplicated or forged or imitated by impostors, and they are extracted from interactions that the user performs as part of semi-random actions and which cannot be easily imitated or forged or "stolen" by attackers.

Then, a Fingerprint and User Characteristic Fusion Unit 150 may then fuse together, via a suitable mathematical algorithm and/or mathematical function and/or hashing function and/or a non-hashing mathematical fusion function and/or one-way function and/or cryptographic function, at least: (I) the raw fingerprint-scan data of the user, which is based directly on analysis of his scanned fingerprint, together with (II) only one of the set of user-specific features that were extracted. In another embodiment, the Fingerprint and User Characteristic Fusion Unit 150 may fuse together, (I) the raw fingerprint-scan data of the user, which is based directly on analysis of his scanned fingerprint, together with (II) two features (or three features, or a partial subset of K features) out of the set of user-specific features that were extracted.

A lookup table of user-specific features 155 may be used, to track and log and record, which one(s) of the user-specific features for a particular user have already been used for such fusion; and which one(s) of the user-specific features have been extracted but have not yet been used for such fusion. This may be indicated by a flag, a utilization bit, a field in a record, or other suitable indicator(s).

In a demonstrative implementation, for example, Fingerprint and User Characteristic Fusion Unit 150 may utilize a hashing unit 151 and/or a multiplication unit 152, to generate a product of multiplying component (I) above with component(s) (II) above, and/or a hashing of those components, and/or a hashed product of multiplication of those components.

The Fingerprint and User Characteristic Fusion Unit 150 may thus generate a fused data-item, reflecting a unique mathematical function or formula or relation (and/or cryptographic function or formula or relation) that is based on component (I) above with component(s) (II) above; or that is based on other combination or fusion of (I) the generally-static fingerprint data of the user, and (II) one or more generally-stochastic user-specific features (e.g., cognitive, behavioral) that can be extracted from a particular interaction or action that is performed by the user via the device 110.

This fused data-item, or a hashed value thereof, or an encrypted version thereof, may be referred to here as "Reference Fused Signature"; may be generated by a Reference Fused Signature Generator 158; and may be securely stored, locally in device 110 and/or remotely in server 190; for example, in conjunction with a user authentication module 149 of device 110 and/or of server 190, and/or in a Database of Reference Fused Signature(s) of multiple users that access a particular computerized service or website (e.g., banking website; electronic commerce website).

Subsequently, the user may wish to authenticate (or log-in, or log-on, or obtain privileged access) to the same device 110, or to a computerized service that is operated by the remote server 190. The user authentication process thus includes: (a) collecting from the user a scan of his fingerprint; (b) measuring or sensing or monitoring user interactions of the user, and/or device-properties, in order to extract from them the particular user-specific features that were used for creating the Reference Fused Signature; (c) generating an Ad-Hoc Fused Signature, based on the same mathematical or hashing or cryptographic function(s) that had been used for generating the Reference Fused Signature, but applying such function(s) to the currently-scanned (or freshly-scanned) fingerprint and the currently-measured (or freshly-measured) user-specific feature(s), wherein step (c) is performed by an Ad-Hoc Fused Signature Generator 154; (d) comparing the current, fresh, Ad-Hoc Fused Signature of the user, with the previously-stored Reference Fused Signature of the user, by using a Fused Signatures Comparator 153; (e) if the two Fused Signatures are identical, or are sufficiently similar beyond a pre-defined threshold value of similarity, then a match is declared and the user is authenticated; (f) if step (e) fails, then a non-match is declared, and/or the user authentication is aborted or denied or rejected.

It is noted that the lookup table of user-specific features 155 may indicate, and may enable the device 110 and/or the remote server 190 to differentiate among, three (or more) types of user-specific features for a particular user: (a) user-specific features that were already extracted but were never used for generating a Reference Fused Signature; (b) user-specific features that were extracted and that were used for the currently-valid Reference Fused Signature; (c) user-specific features that were extracted and that had been used for generating previously-valid but currently-invalid (currently expired, currently canceled, currently discarded) Reference Fused Signatures. Particularly, the list of one or more user-specific feature(s) of type (b), may be used in order to generate the Ad-Hoc Fused Signature, in order to compare it to the currently-valid Reference Fused Signature that had been generated using those same user-specific features.

As a result, an attacker or impostor or hacker that is able to "steal" or "lift" the fingerprint of the legitimate user, or is able to otherwise duplicate or copy or replicate it, would not be able to authenticate to the device 110 and/or to the server 190, since the interactions by such attacker and/or the device-properties during such interactions of the attacker, do not exhibit the same user-specific features that only interactions of the legitimate (genuine) user exhibit; and thus, the Ad-Hoc Fused Signature generated for such attacker, even if using the exact same fingerprint scan of the legitimate user, would not be identical or sufficiently similar to the Reference Fused Signature that was generated based on the unique user interactions performed by the legitimate user. In order to successfully "hack" or attack the device 110 or the remote server 190, such attacker would not only a replica of the fingerprint scan of the legitimate user, but also would need to precisely duplicate the exact manner in which the legitimate user interacts with the device 110 (or with the computerized service served by server 110) with regard to a particular action or interaction that is hidden from the attacker's knowledge and is not known to the attacker (or to the legitimate user).

Moreover, if the device 110 and/or the remote server 190 receive as input, the replica fingerprint or the duplicate fingerprint that is submitted by the attacker, but accompanied with user interactions (by the attacker) that do not yield the same Fused Signature, then the device 110 and/or the remote server 190 may determine that the fingerprint of the legitimate user has been compromised; and notification about such compromise may be relayed to the genuine user (e.g., through a different channel, such as by secure communication, or by email or SMS message) as well as to a fraud department of the relevant organization (e.g., bank, electronic commerce website).

Additionally, if the system determines or estimates that the fingerprint of a particular user has been compromised or replicated, and/or if the legitimate user himself (or a trusted third party) submits an indication that the fingerprint was compromised or replicated, then device 110 and/or server 190 may utilize a Reference Fused Signature Updater/Replacer Module 157 in order to discard or invalidate the most-recent Reference Fused Signature, and to generate in its place a new, valid, Reference Fused Signature that would be based on the same fingerprint of the user but this time fused with other user-specific feature(s) that were extracted from interactions of the legitimate user (e.g., user-specific features of type (c) in the lookup table of user-specific features 155). The system may thus "reset" a Reference Fused Signature of a user, even if the fingerprint of the legitimate user was compromised or replicated, by fusing the generally-static fingerprint scan with a new user-specific feature that can be extracted from another action or another interaction performed by the user, which is again unknown to the legitimate user himself as well as to attackers. Accordingly, the system may provide a fingerprint-based authentication mechanism that further enables replacement and/or resetting of the authentication factor if needed, even if the fingerprint itself is compromised or replicated.

It is further noted that if an attacker or hacker manages to copy, or to steal a digital copy of, the Reference Fused Signature, then the user fingerprint itself cannot be extracted from such Reference Fused Signature, since a one-way cryptographic function or a one-way mathematic function is utilized for producing the Reference Fused Signature.

Some embodiments may provide a method comprising: generating a user-specific fused signature, based on a one-way cryptographic function (or other suitable mathematical function or algorithm) that takes as input: (I) digital representation of a fingerprint scan of the user, and also (II) one user-specific cognitive/behavioral feature that is extracted from monitored user interactions and/or from monitored device-properties during (or before, or after) such user interactions. Firstly, a Reference fused signature is generated and stored as a reference user-authentication factor. Subsequently, an Ad-Hoc (or fresh, or current) fused signature is generated during a fresh (or current) user authentication process, based on current (fresh) user interactions and/or current device-properties in response to current interactions. If the ad-hoc fused signature matches the reference fused signature, then the user is authenticated (or, the user-authentication factor is declared as valid or confirmed, if a multiple-factor authentication process is used). If the ad-hoc fused signature does not match the referenced fused signature, then the user authentication is denied or rejected.

Additionally, if the user's fingerprint is compromised or replicated by an attacker, then the currently-valid (or, most-recent) Reference fused signature is discarded or voided; and is replaced by a newly-generated, replacement, Reference fused signature that is based on a different, not-yet-used, user-specific feature that is extracted from user interactions and/or from device-properties in response to such user interactions.

Although portions of the discussion herein may relate, for demonstrative purposes, to "a fingerprint", some embodiments may utilize, instead, a set of two or more fingerprints of two or more fingers of the user, or multiple fingerprints of multiple fingers of the user, and/or other suitable prints (e.g., palm prints; retina scan, eye scan) and/or other suitable biometric factors (e.g., voice sample, speech sample, audio sample). For example, a biometric signature that is based on retina scan or on voice sample, instead of being utilized by itself as a user-authentication factor, may be fused together (e.g., via a one-way cryptographic function, or via other suitable mathematical or cryptographic function) with a user-specific cognitive/behavioral feature (or, with a combination or a set of several such user-specific features) that is (or are) extracted from user interactions with the device 110 and/or with the computerized service managed (or provided, or served) by the remote server 190, and/or with device-properties (e.g., device acceleration, device orientation, device slanting or tilting, device spatial position) during or before or after such user interactions; thereby generating, and utilizing as a user-authentication factor, a fusion of (I) a generally-constant or generally-static or non-replaceable authentication factor (e.g., fingerprint; retina scan; voice sample) with (II) a generally-stochastic user-specific behavioral/cognitive feature extracted from (or in response to) such device interactions by the user; and thereby enabling subsequent resetting or replacement of a "reference" fused signature with an updated one, if the non-replaceable authentication factor is compromised or is duplicated by an attacker.

It is noted that device 110, as well as other components of system 100 (e.g., server 190), may further comprise other suitable hardware components and/or software modules; for example, a storage unit (e.g., Hard Disk Drive (HDD), Solid State Drive (SSD), Flash memory), a memory unit (e.g., RAM, Flash memory), a wireless communication modem or transmitter or receiver or transceiver, a wired modem or transmitter or receiver or transceiver, a power source (e.g., battery, power cell, power transformer), an Operating System (OS), driver(s), applications, or the like.

In some embodiments, a method comprises: (a) capturing a fingerprint that a particular user provides to an electronic device; and generating a raw fingerprint signature that corresponds to bodily features of the fingerprint of said particular user; (b) monitoring user interactions of said particular user, via one or more input units of said electronic device, during the capturing of step (a); and extracting from said user interactions a user-specific characteristic that is specific to the interactions of said particular user with said electronic device; (c) generating a user-specific reference fused data-item, by utilizing both: (I) the raw fingerprint signature that was generated in step (a), and (II) the user-specific characteristic that was extracted in step (b); (d) subsequently, utilizing said reference fused data-item that was generated in step (c), as a reference value for user-authentication of said particular user.

In some embodiments, the monitoring of step (b) is performed concurrently with the capturing of step (a); and/or is performed immediately prior to the capturing of step (a); and/or is performed immediately after the capturing of step (a).

In some embodiments, generating the user-specific fused data item is performed by utilizing at least: (I) the raw fingerprint signature that was generated in step (a), and (II) a user-specific behavioral characteristic that indicates a user-specific manner of behavior of said particular user when said particular user utilizes the electronic device to capture said fingerprint.

In some embodiments, generating the user-specific fused data item is performed by utilizing at least: (I) the raw fingerprint signature that was generated in step (a), and (II) a user-specific behavioral characteristic that indicates that said particular user performs a particular slanting of said electronic device when said particular user utilizes the electronic device to capture said fingerprint.

In some embodiments, generating the user-specific fused data item is performed by utilizing at least: (I) the raw fingerprint signature that was generated in step (a), and (II) a user-specific behavioral characteristic that indicates that said particular user performs a particular tilting of said electronic device when said particular user utilizes the electronic device to capture said fingerprint.

In some embodiments, generating the user-specific fused data item is performed by utilizing at least: (I) the raw fingerprint signature that was generated in step (a), and (II) a user-specific behavioral characteristic that indicates that said particular user performs a particular rotating of said electronic device when said particular user utilizes the electronic device to capture said fingerprint.

In some embodiments, generating the user-specific fused data item is performed by utilizing at least: (I) the raw fingerprint signature that was generated in step (a), and (II) a user-specific behavioral characteristic that indicates that said particular user performs a particular accelerated movement of said electronic device when said particular user utilizes the electronic device to capture said fingerprint.

In some embodiments, generating the user-specific fused data item is performed by utilizing at least: (I) the raw fingerprint signature that was generated in step (a), and (II) a user-specific behavioral characteristic that indicates that said particular user performs a particular device-orientation movement of said electronic device when said particular user utilizes the electronic device to capture said fingerprint.

In some embodiments, the method comprises: subsequently, capturing a fresh raw fingerprint and fresh user-interactions, and generating a fresh fused data-item that is based on both (i) the fresh raw fingerprint, and (ii) a fresh user-specific characteristic extracted from the fresh user-interactions; authenticating a user by comparing the fresh fused data-item to said reference fused data-item.

In some embodiments, the method comprises: subsequently, capturing a fresh raw fingerprint and fresh user-interactions, and generating a fresh fused data-item that is based on both (i) the fresh raw fingerprint, and (ii) a fresh user-specific characteristic extracted from the fresh user-interactions; comparing the fresh fused data-item to said reference fused data-item; if the fresh fused data-item matches said reference fused data-item, then authorizing access of the user to a computerized service; if the fresh fused data-item does not match said reference fused data-item, then blocking access of the user to said computerized service.

In some embodiments, generating the reference fused data-item is performed by utilizing at least: (I) the raw fingerprint signature that was generated in step (a), and (II) a set of two different user-specific characteristics that are extracted from user interactions.

In some embodiments, the method comprises: subsequently, receiving an indication that said reference fused data-item was compromised; discarding said reference fused data-item; generating a replacement reference fused data-item, based on both: (I) the raw fingerprint signature that was generated in step (a), and a different user-specific characteristic that is extracted from user interactions.

In some embodiments, wherein the step of generating the reference fused data-item comprises: generating the reference fused data-item by cryptographically hashing together both of: (I) the raw fingerprint signature that was generated in step (a), and (II) the user-specific characteristic that was extracted in step (b);

In some embodiments, the step of generating the reference fused data-item comprises: generating the reference fused data-item by applying a function that receives as input both of: (I) the raw fingerprint signature that was generated in step (a), and (II) the user-specific characteristic that was extracted in step (b), wherein said function generates as output said reference fused data-item.

In some embodiments, step (d) comprises: authenticating said particular user based on said reference fused data-item as a reference, without performing any comparison between (i) the raw fingerprint that was captured in step (a), and (ii) a freshly-captured raw fingerprint.

In some embodiments, step (d) comprises: authenticating said particular user based on said reference fused data-item as a reference, without performing any comparison between (i) a hashed value of the raw fingerprint that was captured in step (a), and (ii) a hashed value of a freshly-captured raw fingerprint.

In some embodiments, the step of generating the reference fused data-item comprises: generating the reference fused data-item by utilizing a function that receives as input both: (I) the raw fingerprint signature that was generated in step (a), and (II) the user-specific characteristic that was extracted in step (b) from a sensed device-acceleration value that was sensed by an accelerometer of said electronic device during the capturing of the fingerprint.

In some embodiments, the step of generating the reference fused data-item comprises: generating the reference fused data-item by utilizing a function that receives as input both: (I) the raw fingerprint signature that was generated in step (a), and (II) the user-specific characteristic that was extracted in step (b) from a sensed device-orientation value that was sensed by one or more gyroscopes of said electronic device during the capturing of the fingerprint.

In some embodiments, the step of generating the reference fused data-item comprises: generating the reference fused data-item by utilizing a function that receives as input at least: (I) the raw fingerprint signature that was generated in step (a), and (II) a first user-specific characteristic that was extracted in step (b) from a sensed device-acceleration value that was sensed by an accelerometer of said electronic device during the capturing of the fingerprint, and (III) a second user-specific characteristic that was extracted in step (b) from a sensed device-orientation value that was sensed by one or more gyroscopes of said electronic device during the capturing of the fingerprint.

In some embodiments, a process comprises: (a) capturing a fingerprint that a particular user provides to an electronic device; generating a raw fingerprint signature that corresponds to bodily features of the fingerprint of said particular user; and applying a hashing function to generate a hashed value of said raw fingerprint signature; (b) monitoring user interactions of said particular user, during the capturing of step (a), via one or more input units of said; extracting from said user interactions a user-specific characteristic that is user-specific to the interactions of said particular user; (c) generating a user-specific reference fused data-item, by utilizing both: (I) the hashed value of the raw fingerprint signature that was generated in step (a), and (II) the user-specific characteristic that was extracted in step (b); and (d) subsequently, utilizing said reference fused data-item as a reference for user-authentication of said particular user.

Some embodiments of the present invention may optionally comprise or may utilize, one or more units and/or devices and/or methods, that are described in the following United States patents which are all hereby incorporated by reference in their entirety: U.S. Pat. Nos. 8,938,787; 9,275,337; 9,541,995; 9,526,006; 9,071,969; 9,712,558.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   (a) capturing a fingerprint that a particular user provides to an electronic device during a first usage-session of said particular user with said electronic device; and generating a raw fingerprint signature that corresponds to bodily features of the fingerprint of said particular user; wherein said capturing is performed by a first input unit of said electronic device, the first input unit being a fingerprint scanning unit of said electronic device;
   (b) monitoring user interactions of said particular user, during a second, different, usage-session of said particular user with said electronic device, via a second, different, input unit of said electronic device, wherein said monitoring is performed by said second input unit which is an input unit selected from the group consisting of: accelerometer, gyroscope, device spatial-orientation sensor; and extracting from said user interactions a user-specific behavioral characteristic that is specific to the interactions of said particular user with said electronic device;
   (c) generating a user-specific reference fused data-item, by hashing together: (I) the raw fingerprint signature that was generated in step (a) based on the fingerprint as scanned by said first input unit during said first usage-session, and (II) the user-specific behavioral characteristic that was extracted in step (b) based on user interactions monitored via said second input unit during said second usage-session;
   (d) subsequently, utilizing said reference fused data-item that was generated in step (c), as a reference value for user-authentication of said particular user.

2. The method of claim 1, wherein the monitoring of step (b) is performed non-concurrently with the capturing of step (a).

3. The method of claim 1, wherein the monitoring of step (b) is performed at least T minutes prior to the capturing of step (a), wherein T is a pre-defined value.

4. The method of claim 1, wherein the monitoring of step (b) is performed at least T minutes after the capturing of step (a), wherein T is a pre-defined value.

5. The method of claim 1, wherein generating the user-specific fused data item is performed by utilizing at least: (I) the raw fingerprint signature that was generated in step (a), and (II) a user-specific behavioral characteristic that indicates a user-specific manner of behavior of said particular user when said particular user utilizes the electronic device to perform operations other than capturing said fingerprint.

6. The method of claim 1, wherein generating the user-specific fused data item is performed by utilizing at least: (I) the raw fingerprint signature that was generated in step (a), and (II) a user-specific behavioral characteristic that indicates that said particular user performs a particular slanting of said electronic device when said particular user utilizes the electronic device.

7. The method of claim 1, wherein generating the user-specific fused data item is performed by utilizing at least: (I) the raw fingerprint signature that was generated in step (a), and (II) a user-specific behavioral characteristic that indicates that said particular user performs a particular tilting of said electronic device when said particular user utilizes the electronic device.

8. The method of claim 1, wherein generating the user-specific fused data item is performed by utilizing at least: (I) the raw fingerprint signature that was generated in step (a), and (II) a user-specific behavioral characteristic that indicates that said particular user performs a particular rotating of said electronic device when said particular user utilizes the electronic device.

9. The method of claim 1, wherein generating the user-specific fused data item is performed by utilizing at least: (I) the raw fingerprint signature that was generated in step (a), and (II) a user-specific behavioral characteristic that indicates that said particular user performs a particular accelerated movement of said electronic device when said particular user utilizes the electronic device.

10. The method of claim 1, wherein generating the user-specific fused data item is performed by utilizing at least: (I) the raw fingerprint signature that was generated in step (a), and (II) a user-specific behavioral characteristic that indicates that said particular user performs a particular device-orientation movement of said electronic device when said particular user utilizes the electronic device.

11. The method of claim 1, comprising:
subsequently, capturing a fresh raw fingerprint and fresh user-interactions, and generating a fresh fused data-item that is based on both (i) the fresh raw fingerprint, and (ii) a fresh user-specific characteristic extracted from the fresh user-interactions;
authenticating a user by comparing the fresh fused data-item to said reference fused data-item.

12. The method of claim 1, comprising:
subsequently, capturing a fresh raw fingerprint and fresh user-interactions, and generating a fresh fused data-item that is based on both (i) the fresh raw fingerprint, and (ii) a fresh user-specific characteristic extracted from the fresh user-interactions;
comparing the fresh fused data-item to said reference fused data-item;
if the fresh fused data-item matches said reference fused data-item, then authorizing access of the user to a computerized service;
if the fresh fused data-item does not match said reference fused data-item, then blocking access of the user to said computerized service.

13. The method of claim 1, wherein generating the reference fused data-item is performed by utilizing at least:
(I) the raw fingerprint signature that was generated in step (a), and (II) a set of two different user-specific characteristics that are extracted from user interactions that are monitored across at least two separate usage-sessions.

14. The method of claim 1, comprising:
subsequently, receiving an indication that said reference fused data-item was compromised;
discarding said reference fused data-item;
generating a replacement reference fused data-item, based on both: (I) the raw fingerprint signature that was generated in step (a) during the first usage-session, and a different user-specific characteristic that is extracted from user interactions during said second usage-session or during another, third, user session.

15. The method of claim 1, wherein step (d) comprises:
authenticating said particular user based on said reference fused data-item as a reference, without performing any comparison between (i) the raw fingerprint that was captured in step (a), and (ii) a freshly-captured raw fingerprint.

16. The method of claim 1, wherein step (d) comprises:
authenticating said particular user based on said reference fused data-item as a reference, without performing any comparison between (i) a hashed value of the raw fingerprint that was captured in step (a), and (ii) a hashed value of a freshly-captured raw fingerprint.

17. The method of claim 1, wherein the step of generating the reference fused data-item comprises:
generating the reference fused data-item by utilizing a function that receives as input both: (I) the raw fingerprint signature that was generated in step (a), and (II) the user-specific characteristic that was extracted in step (b) from a sensed device-acceleration value that was sensed by an accelerometer of said electronic device.

18. The method of claim 1, wherein the step of generating the reference fused data-item comprises:
generating the reference fused data-item by utilizing a function that receives as input both: (I) the raw fingerprint signature that was generated in step (a) during said first usage-session, and (II) the user-specific characteristic that was extracted in step (b) from a sensed device-orientation value that was sensed by one or more gyroscopes of said electronic device during said second usage-session.

19. The method of claim 1, wherein the step of generating the reference fused data-item comprises:
generating the reference fused data-item by utilizing a function that receives as input at least:
(I) the raw fingerprint signature that was generated in step (a) during said first usage-session, and also
(II) a first user-specific characteristic that was extracted in step (b) from a sensed device-acceleration value that was sensed by an accelerometer of said electronic device during said second usage-session, and also
(III) a second user-specific characteristic that was extracted in step (b) from a sensed device-orientation value that was sensed by one or more gyroscopes of said electronic device during said second usage session.

20. A process comprising:
(a) capturing a fingerprint that a particular user provides to an electronic device during a first usage-session of said particular user with said electronic device; and generating a raw fingerprint signature that corresponds to bodily features of the fingerprint of said particular user; wherein said capturing is performed by a first input unit of said electronic device, the first input unit being a fingerprint scanning unit of said electronic device; and generating a hashed value of said raw fingerprint signature;
(b) monitoring user interactions of said particular user, during a second, different, usage-session of said particular user with said electronic device, via a second, different, input unit of said electronic device, wherein said monitoring is performed by said second input unit which is an input unit selected from the group consisting of: accelerometer, gyroscope, device spatial-orientation sensor; and extracting from said user interactions a user-specific behavioral characteristic that is specific to the interactions of said particular user with said electronic device; and generating a hashed value of said user-specific behavioral characteristic;
(c) generating a user-specific reference fused data-item, by hashing together: (I) the hashed value of the raw fingerprint signature that was generated in step (a) based on the fingerprint as scanned by said first input unit during said first usage-session, and (II) the hashed value of the user-specific behavioral characteristic that was extracted in step (b) based on user interactions monitored via said second input unit during said second usage-session;
(d) subsequently, utilizing said reference fused data-item that was generated in step (c), as a reference value for user-authentication of said particular user.

* * * * *